July 31, 1945.   H. A. HICKS ET AL   2,380,523
VEHICLE BODY STRUCTURE
Filed Oct. 8, 1941   5 Sheets-Sheet 1
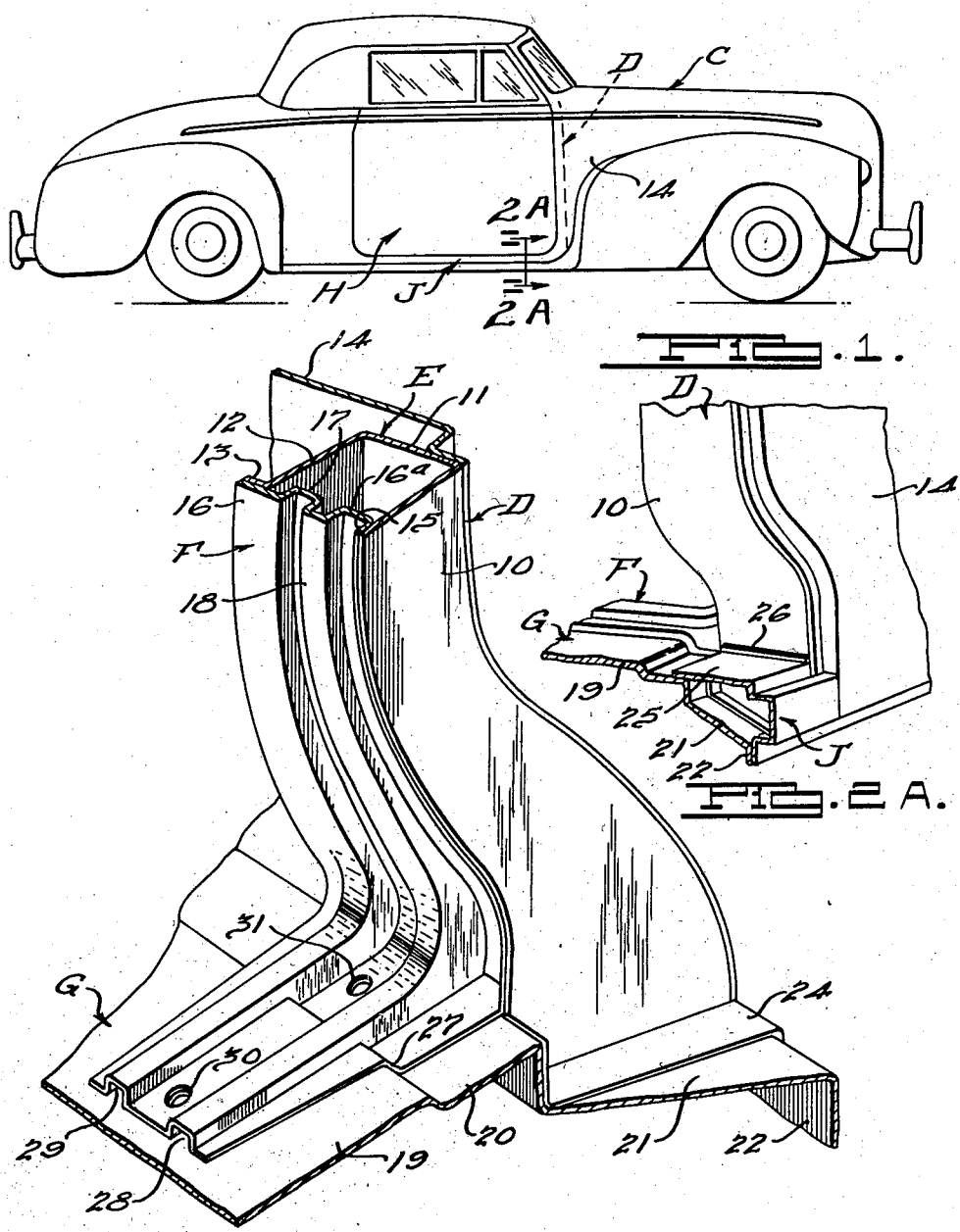
INVENTORS.
Harold A. Hicks,
Ira E. Johnson,
BY Albert W. Ross.
Harness, Dick, Patee & Harris
ATTORNEYS.

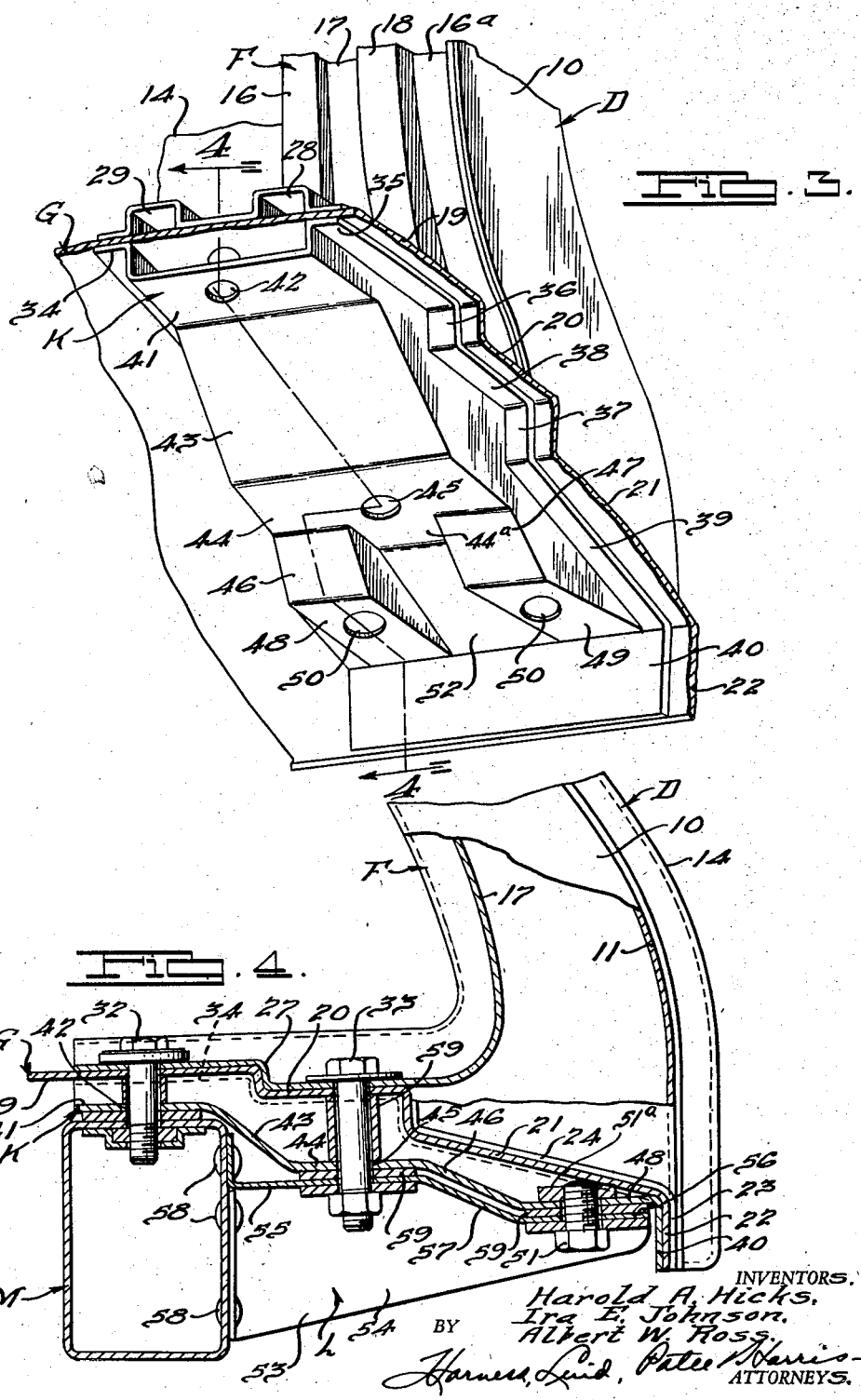

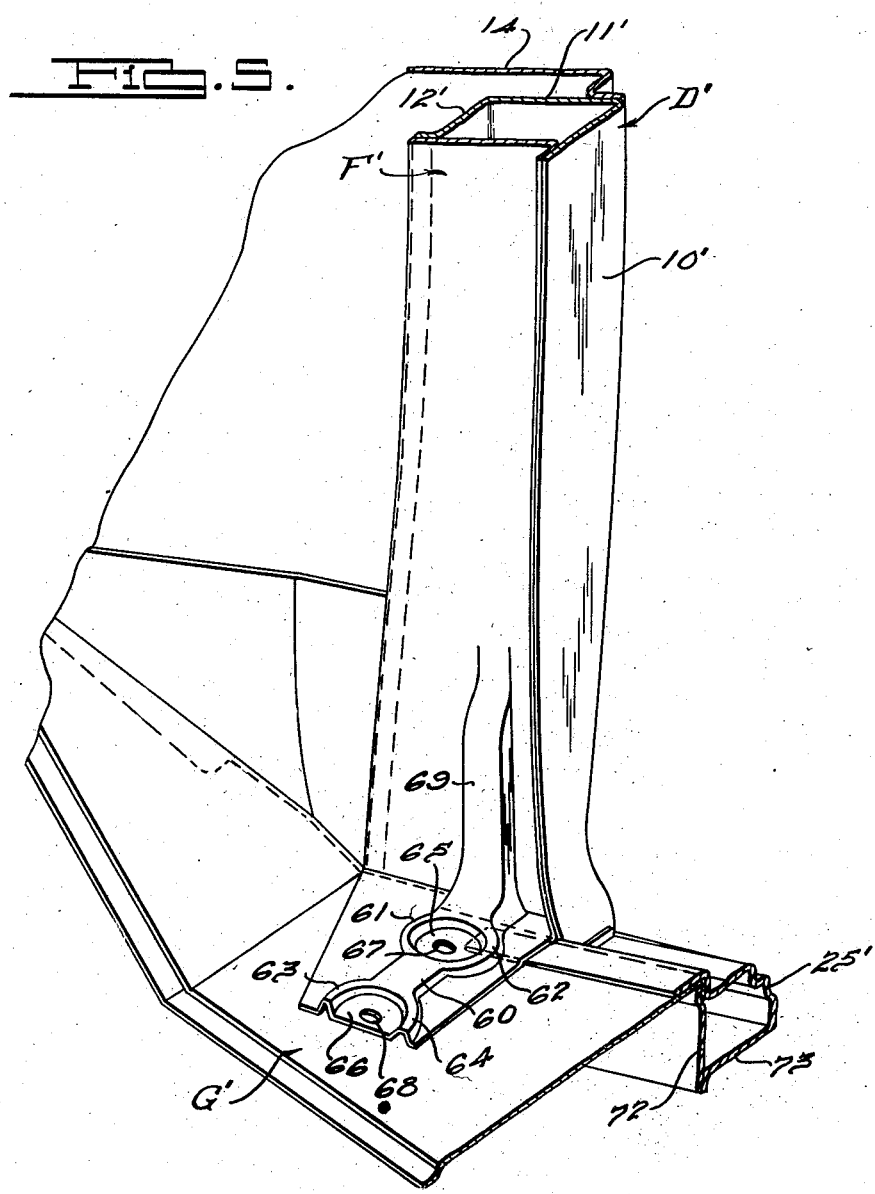

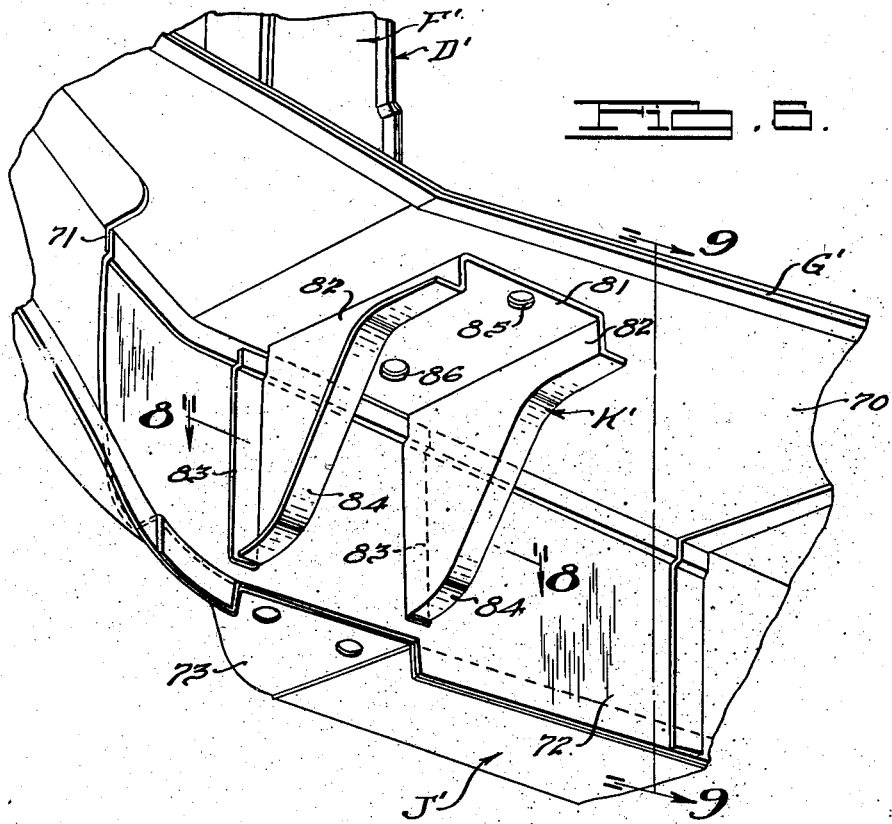
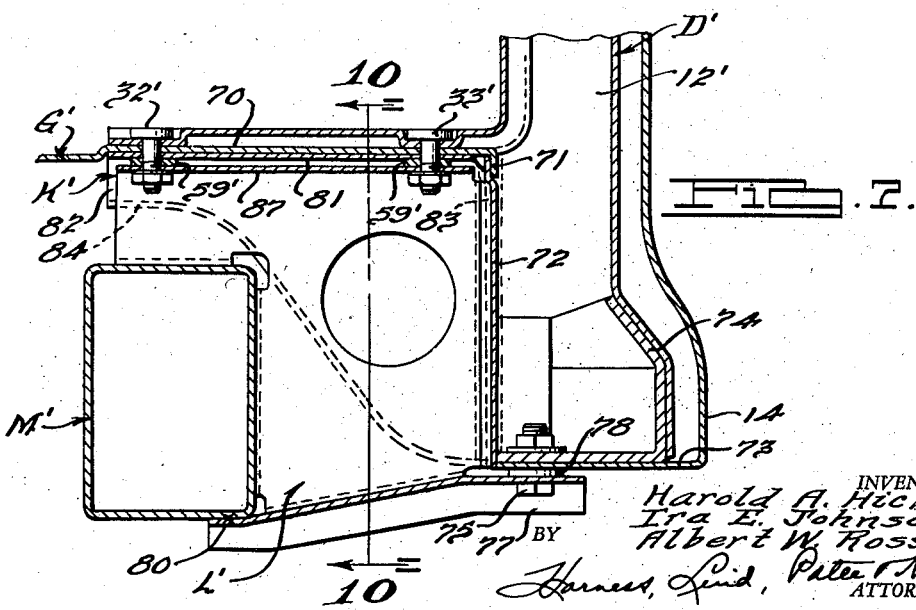

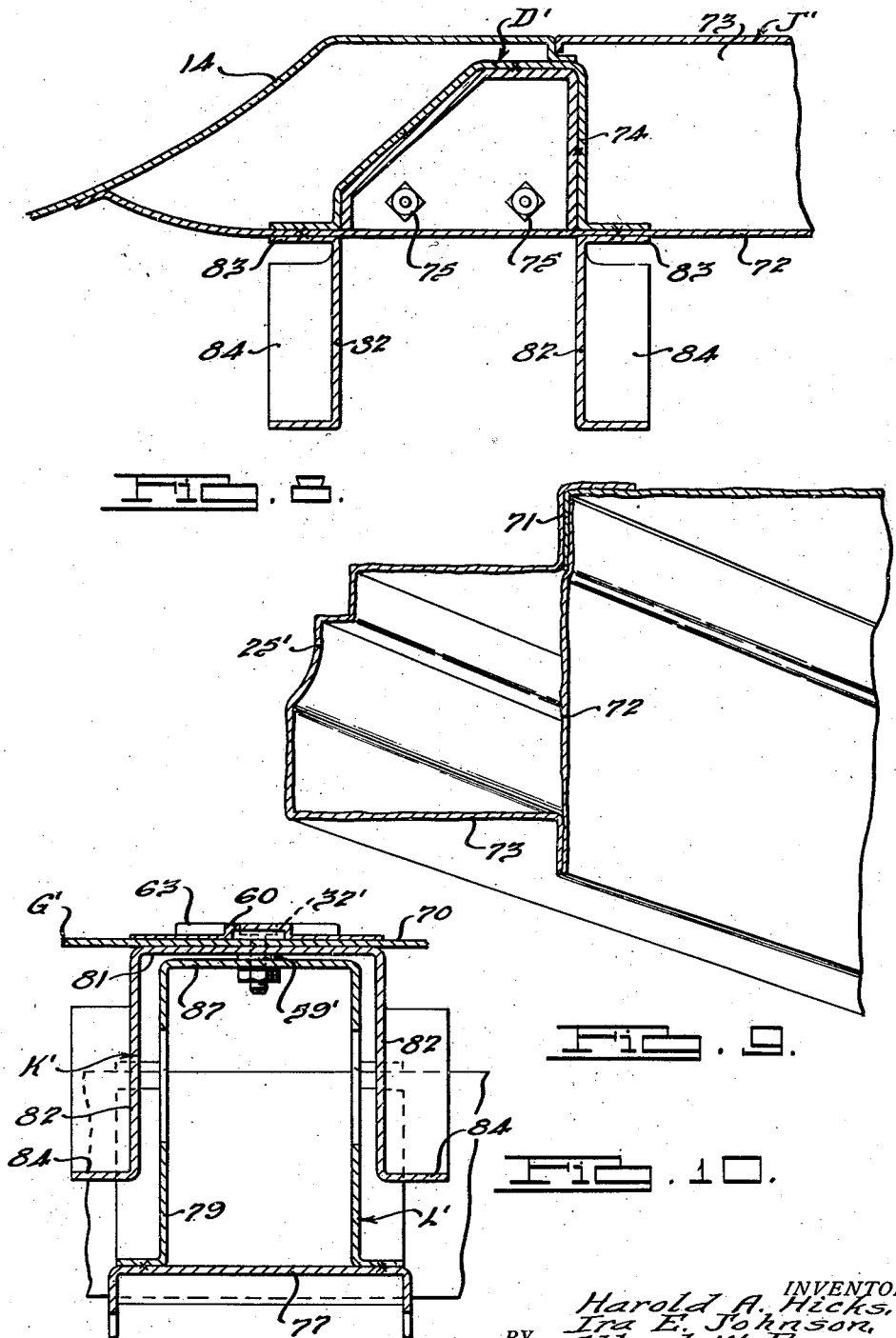

Patented July 31, 1945

2,380,523

UNITED STATES PATENT OFFICE 2,380,523

VEHICLE BODY STRUCTURE

Harold A. Hicks, Detroit, Ira E. Johnson, Huntington Woods, and Albert W. Ross, Detroit, Mich., assignors to Chrysler Corporation, Highland Park, Mich., a corporation of Delaware Application October 8, 1941, Serial No. 414,102

20 Claims. (Cl. 296—28)

This invention relates to motor vehicles and refers more particularly to improvements in the body and frame structures therefor.

In motor vehicles there is a tendency for the body to shake and weave laterally as the vehicle runs along the roadway, this lateral shake presenting a variety of design problems which are aggravated in modern types of vehicles where low level floors and low ground clearance affords only a relatively shallow depth to tie the body to the frame. While the aforesaid design problems occur in a variety of body types, they are greatly accentuated in the convertible type of body wherein there is no rigid roof to act as a cross-brace for the tops of the A-posts and door columns resulting in a requirement that the body structure must be rigidly tied to the frame at the bottoms of these structural posts and columns where, because of the aforesaid specifications, only a shallow depth is available.

Our invention has for its object the provision of a body structure especially of the convertible type so arranged as to afford an improved tie with the frame resulting in improved lateral stability as well as added strength and rigidity of the body and frame in general. Our invention is adaptable to advantage in body structures other than convertible types.

Another object is to provide a commercially practicable and improved joint structure between the A-post and frame or between other body columns and frame of the vehicle.

Further objects and advantages of our invention will be more apparent as this specification progresses, reference being made to the accompanying drawings in which:

Fig. 1 is a side elevational view of a motor vehicle of the convertible type.

Fig. 2 is a perspective view of the right front structural column or A-post looking forwardly about as it would be viewed by the vehicle driver if the trim parts were removed.

Fig. 2A is a sectional perspective view taken as indicated by line 2A—2A of Fig. 1.

Fig. 3 is a perspective view looking up at the bottom of the Fig. 2 structure.

Fig. 4 is a sectional elevational view, transversely of the vehicle, through the Fig. 3 structure but shown mounted on the chassis frame, the section being taken approximately as indicated by line 4—4 of Fig. 3.

Fig. 5 is a perspective view generally similar to Fig. 2 but illustrating a modified structure.

Fig. 6 is a bottom perspective view of the Fig. 5 structure.

Fig. 7 is a sectional elevational view, transversely of the vehicle, through the Fig. 5 structure shown mounted on the chassis frame.

Fig. 8 is a sectional plan view through the column, the view being taken as indicated by line 8—8 of Fig. 6.

Fig. 9 is a transverse sectional perspective view taken as indicated by line 9—9 of Fig. 6.

Fig. 10 is a sectional elevational view taken as indicated by line 10—10 of Fig. 7.

Referring to the drawings we have illustrated our invention in connection with the right front metal A-post, it being understood that the left front A-post as well as the B-posts, when employed, are intended to be similarly constructed.

The vehicle C of the convertible type comprises a body structure having its right front A-post D formed as a hollow section by a channel member E to which is welded a liner F. The channel member E comprises a transverse door-margin wall 10 which bends forwardly to provide the outer longitudinally extending wall 11 and then inwardly at wall 12 which terminates in a forward flange 13. The cowl side panel 14 is welded to the outer surface of wall 11. The liner F has a flange 15 welded to the inner face of wall 10 and then extends forwardly in return-bent or corrugated fashion terminating in marginal flange or wall 16 welded to flange 13. The illustrated corrugations afford stiffening of the column and comprise a pair of co-planar outer walls 16ᵃ, 17 and a pair of inner co-planar walls 18 and 16.

The body floor G has a main inner portion 19 of desired height, connecting with a portion 20 which is slightly depressed inwardly adjacent column D, and a further portion 21 which is further depressed and which slopes downwardly and outwardly to provide a bottom for the column. The portion 21 terminates in a flange 22 which is welded rearwardly adjacent column E to the downturned portion 23 of the flange 24 extending from the bottom of plate 10, this flange being also welded to the top face of floor portion 21. Within the column the flange portion 23 is welded to the inner face of plate 11.

Rearwardly of column E along the bottom of the opening for door H, the body is formed with a hollow sill J which, as seen in Fig. 2A, comprises the floor portions 20, 21 and 22 forming the bottom of the sill and a boxing-in member 25 which is welded to floor portion 20 and flange 22. The member 25 is welded to the column E where it engages the column. In this connection the member 25 has an upturned flange 26 welded to the rear face of plate 10. The sill structure is omitted in Figs. 2 and 4 in order to more clearly show the parts 21 and 24 in these views.

The liner F extends to the bottom of column E and then extends structurally inwardly to form a foot for welding to the upper face of floor G forming a hollow boxed-in reinforcement therewith, the floor having a further member K welded therebeneath and forming therewith a further boxed-in reinforcement, the resulting upper and lower hollow structures with the floor lying there-between being rigidly secured by fastener assemblies to an outboard or cantilever bracket L projecting outwardly from the hollow side rail M of the chassis frame. This structural arrangement is fashioned as follows.

Liner F has a bottom structural extension foot stepped at 27 so that walls 16ª, 17 will lie flat along floor portions 19 and 20 while wall 18 is raised to form a boxed-in or hollow reinforcement at 28 above the floor. Flange 16, at the extension foot portion of liner F which overlies the floor, is formed with a further rib defining a second hollow reinforcement 29. The floor and liner extension foot are provided with bolt-receiving holes 30, 31 for receiving bolts 32, 33 between ribs 28, 29.

The reinforcing member K, best seen in Figs. 3 and 4, has a pair of longitudinally spaced flanges 34, 35 welded to floor portion 19, these flanges being stepped at 36 and 37 to disposed successive flange portions 38, 39 so as to underlie floor portions 20, 21 to which they are respectively welded. At the outer end of member K these flanges 34, 35 merge into a planar flange 40 which is welded to the inner face of floor flange 22.

Intermediate the flanges 34, 35 there is a body portion of member K which is depressed downwardly to provide a hollow reinforcing boxed-in structure. This depressed body portion comprises a wall 41 which extends parallel to floor portion 19 and which has an opening 42 positioned to receive bolt 32, the wall 41 then being sloped or stepped at 43 to locate a second wall 44 parallel to floor portion 20. This wall 44 has an opening 45 adapted to receive bolt 33, the depressed body then continuing by the longitudinally spaced sloping portions 46, 47 to position spaced walls 48, 49 horizontally. These walls 48, 49 have an opening 50 through which the shank of a bolt 51 extends for threading into a nut 51a welded to the upper face of the respective walls 48, 49. Intermediate the resulting hollow reinforcements formed by the pairs of walls 46, 48 and 47, 49 the sloping wall 44 continues at 44a to the sloping floor portion 21 when it parallels the underface of floor portion 21 at 52 for welding thereto, finally merging into flange 40. Fig. 4 deviates somewhat from a true planar section in order to show the continuous boxed-in structure 41, 43, 44, 46 and 48, it being understood that a similar structure is formed by portions 41, 43, 44, 47 and 49.

The cantilever frame outrigger L comprises a downturned channel bracket having side flanges 53, 54 and a top wall formed by parallel portions 55, 56 joined by a sloping portion 57 all spaced below member K. The outrigger L is rigidly attached at its inner end to frame member M as at rivets 58. Steel washers or cylinders 59 cooperate with the various bolt assemblies 32, 33, 51, thereby serving to securely and rigidly mount the body structure on the frame side rail M and outrigger L.

Referring now to the embodiment illustrated in Figs. 5 to 10, the column D' is generally similar to the aforesaid column D particularly with respect to its corresponding component walls 10', 11' and 12'. The filler F" extends structurally inwardly to provide a foot for welding to the upper face of floor G' as before, this extension now being formed with a return bent rib 60 to provide a hollow boxed-in reinforcement, this rib branching at 61, 62 and at 63, 64 around the respective floor-engaging portions 65 and 66 formed with bolt-receiving holes 67 and 68. The rib 60 extends upwardly at 69 for a portion of the height of column D' above floor G'.

The floor G' is now flat at 70 below the bottom extension foot of filler F' and terminates outwardly in a downturned flange 71 which is welded to the upper end of a longitudinally extending skirt member 72 which, in effect, is a continuation structurally of liner F below floor G'. The sides 10' and 12', bottom member 73, and outer wall 11' of coumn D' receive a reinforcing member 74 welded in position, the bottom wall of which member having suitable openings and nuts 75 welded into position to receive the bolts 76 for attachment to the channeled portion 77 of outrigger L' welded or riveted to the top and outer face of chassis side rail M'. A steel washer 78 maintains a rigid connection between the body and frame as before.

The skirt 72 extends fore and aft beyond column D' to form the inner wall of body sill J' being welded to outer member 25' and floor flange 71 as shown in Fig. 9.

The outrigger L' is of boxed-in structure comprising a main channeled member 79 closed at the bottom by the member 77 which also has a weld connection with the bottom of rail M' at 80. A further stiffener member K' is introduced between floor G' and outrigger L', this member K' having an upper wall 81 welded to the underface of floor portion 70, and side webs 82. Each side web 82 has an outer flange 83 welded to skirt 72 and a bottom marginal stiffener flange 84.

Bolt assemblies serve, as before, in conjunction with steel washers 59', used where spacing of parts is desired, to removably but rigidly attach or mount the foot extension of liner F' on the outrigger L'. In the present embodiment these bolts assemblies extend through aligned openings 85, 86 in the upper wall 87 of outrigger L' and in portion 81 of member K' thence through floor portion 70 to respectively align with openings 67 and 68 to locate the bolt heads on floor portions 65 and 66 as seen in Fig. 7.

In each embodiment of our invention the body parts are welded together where they contact to provide a structural unit of rigid construction for rigid attachment to the frame outrigger which, in turn, is rigidly united with the chassis rail. The resulting structures provide improved rigidity in the body and frame structures insuring against undesired lateral shake or distortion in the body while at the same time utilizing only a shallow depth for the joint between the columns, frame, floor, and body sills.

In each of Figs. 3 and 6 it will be apparent that the reinforcing members K or K' each has a stiffener portion thereof disposed to lie in spaced relationship and below the floor, such stiffener portions extending generally transversely and longitudinally of the vehicle. In Fig. 3 the member K has portions 41, 43, 44, 46, 47, 48 and 49 of such character and member K' has corresponding portions 84.

We claim:

1. In a motor vehicle, a body structure having a floor and a hollow column, said column comprising a filler member, said filler member facing inwardly of the body structure and having a structural extension foot projecting transversely inwardly of the body structure above said floor for welded attachment thereto, said foot being formed with an upstanding rib forming, with said floor, a hollow boxed-in reinforcement, a reinforcing member secured to the undersurface of said floor below said foot, a frame underlying said floor, a cantilever outrigger structurally united with said frame and having a portion projecting laterally outwardly therefrom beneath said column, and a pair of tie-fastener assemblies spaced from each other along the length of said foot, each of said assemblies extending through said foot, floor, and reinforcing member, whereby to mount the body structure on said frame, at least one of said assemblies having connection with said outrigger, and a third tie assembly securing said outrigger portion to said column, said rib being disposed intermediate said assemblies and having two pairs of rib portions branching therefrom, each pair being connected by a foot portion lying flush with said floor to receive one of said assemblies.

2. In a motor vehicle according to claim 1, said reinforcing member comprising an intermediate wall portion adapted to receive said tie-fastener means and a pair of substantially vertical side walls depending below said intermediate wall portion, said side walls increasing in depth toward said column and being spaced to receive a portion of said outrigger therebetween, each of said side walls having a bottom marginal flange.

3. In a motor vehicle, a body structure having a floor and a hollow column extending below the latter, said column comprising a filler member, said filler member facing inwardly of the body structure and having a structural extension foot projecting transversely inwardly of the body structure above said floor for welded attachment thereto, said foot being formed with an upstanding rib forming, with said floor, a hollow boxed-in reinforcement, a reinforcing member channel-shaped in cross section secured to the undersurface of said floor below said foot and to said column below said floor, a frame underlying said floor, a cantilever outrigger structurally united with said frame and projecting laterally outwardly therefrom, a portion of said outrigger being channel-shaped in cross section and disposed in nested relation with said reinforcing member, a pair of tie-fastener assemblies spaced from each other along the length of said foot, each of said assemblies extending through said foot, floor, and reinforcing member, whereby to mount the body structure on said frame, at least one of said assemblies having connection with said outrigger, said outrigger having an outer end portion underlying at least a portion of said column, and additional fastener means for connecting said outrigger end portion to the last said column portion.

4. In a motor vehicle, a body structure having a floor and a hollow column, said floor having a first portion thereof spaced inwardly from the bottom of said column and a second portion thereof adjacent said column depressed step-like with respect to said first floor portion, said column having a filler member facing inwardly of the body structure and having a structural extension foot projecting transversely inwardly of the body structure above said floor, said foot having relatively stepped portions thereof lying flush and in vertically aligned relationship with said stepped floor portions for welding attachment thereto, a reinforcing member secured to the undersurface of said floor below said foot and having a wall thereof formed with relatively stepped portions thereof disposed in vertically aligned relationship with and to respectively underlie said stepped floor portions, a frame structure underlying said floor, and a pair of tie fastener assemblies respectively extending through the vertically aligned stepped portions of said foot, floor, and wall of said reinforcing member for connection with said frame structure.

5. In a motor vehicle, a body structure having a floor and a hollow column, said floor having a first portion thereof spaced inwardly from the bottom of said column and a second portion thereof adjacent said column depressed step-like with respect to said first floor portion, said column having a filler member facing inwardly of the body structure and having a structural extension foot projecting transversely inwardly of the body structure above said floor, said foot having relatively stepped portions thereof lying flush and in vertically aligned relationship with said stepped floor portions for welding attachment thereto, a reinforcing member secured to the undersurface of said floor below said foot and having a wall thereof formed with relatively stepped portions thereof disposed in vertically aligned relationship with and to respectively underlie said stepped floor portions, a frame structure comprising a side rail and an outrigger projecting cantilever-like outwardly therefrom below said foot, a tie fastener assembly extending from said side rail through the innermost of said vertically aligned stepped portions of said wall, floor, and foot, and a second tie fastener assembly extending from said outrigger through the outermost of said vertically aligned stepped portions of said wall, floor, and foot.

6. In a motor vehicle according to claim 5, said floor having a third portion depressed below said second portion across the bottom of said column, said wall having a third portion thereof underlying and disposed below said third floor portion, and a third tie fastener assembly extending from said outrigger through said third portions of said floor and wall.

7. In a motor vehicle, a body structure having a floor and a hollow column, said column comprising a filler member, said filler member facing inwardly of the body structure and having a structural extension foot projecting transversely inwardly of the body structure above said floor for welded attachment thereto, a reinforcing member secured to the undersurface of said floor underlying said foot, a frame underlying said floor, a cantilever outrigger structurally united with said frame and projecting laterally outwardly therefrom, said reinforcing member comprising a first wall portion flush with said floor and a second wall portion so spaced from said floor as to form therewith a hollow boxed-in reinforcement extending between the frame and that portion of the floor underlying said foot and laterally outwardly from the frame over said outrigger, and a pair of tie fastener assemblies spaced from each other along the length of said foot, each of said assemblies extending through said foot, floor, and the second wall portion of said reinforcing member for respective connection with said frame and outrigger.

8. In a motor vehicle according to claim 7, said second wall portion of said reinforcing member having adjacent its outer end a pair of longitudinally spaced extensions depressed downwardly therefrom below said floor, and additional tie-fastener assemblies extending through said wall extensions for connection with said outrigger.

9. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member having a portion thereof channel-shaped in cross section disposed in the vertical space between said floor and rail, said member extending laterally outwardly beyond said rail, a cantilever outrigger structurally united with said rail and projecting outwardly therefrom beneath said foot, floor, reinforcing member and column, first means securing together said foot, floor and reinforcing member at the region thereof registering vertically with said rail, second means securing together said foot, floor, reinforcing member and outrigger laterally outwardly from said first means, and a structural connection between the outrigger and column laterally outwardly from said second securing means.

10. In a motor vehicle including a frame having a side rail, a body structure including a floor overlying said rail in vertically spaced relation and projecting laterally outwardly therefrom, said body further including components forming a hollow column having at least the base portion thereof disposed laterally outwardly from said rail and including a foot projecting inwardly from said column to overlie said floor and rail, a reinforcing member having a portion thereof channel-shaped in cross section disposed in the vertical space between said floor and rail, said member extending laterally outwardly beyond said rail, a cantilever outrigger structurally united with said rail and projecting outwardly therefrom beneath said foot, floor, reinforcing member and column, first means securing together said foot, floor, and reinforcing member at the region thereof registering vertically with said rail, second means securing together said foot, floor, reinforcing member and outrigger laterally outwardly from said first means, and a structural connection between the outrigger and column laterally outwardly from said second securing means, said floor having a flange at the outer terminal edge thereof abutting and secured to a component of said column.

11. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member extending laterally outwardly from the rail between the latter and said column beneath said floor and foot and secured thereto at locations spaced longitudinally of the foot, and an outrigger member secured to and projecting laterally outwardly from said rail beneath said foot, floor, reinforcing member and said column and structurally connected therewith, at least one of said members extending into the space between the floor and rail and being shaped in cross section to form a channel extending between the floor and rail and laterally outwardly between the latter and said column.

12. In a motor vehicle, a body structure including a column, a body support extending lengthwise of the vehicle disposed laterally inwardly from at least the base of said column, means securing the body to said support of said column including a member secured to said support and projecting outwardly therefrom toward said column, a first portion of said member extending beneath the base of said column and so connected therewith as to oppose movement of the latter relative to said support, said member having a second portion intermediate said column and support channel-shaped in cross section disposed at an elevation above the first mentioned portion thereof, a foot extending inwardly from said column over the second portion of said member, and means securing said foot to the second portion of said member laterally between the column and support and at an elevation above the said connection between the first portion of said member and said column.

13. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member having a portion thereof channel-shaped in cross section disposed in the vertical space between said floor and rail and extending laterally outwardly beyond the latter, said member at the channel thereof being so spaced from said floor as to form in cooperation therewith a hollow box-like reinforcement immediately above said rail and extending laterally outwardly therefrom beneath said column, means securing said foot, floor, and reinforcing member to said rail, a cantilever outrigger secured to and projecting outwardly from said rail disposed beneath said reinforcing member and a portion of said box-like reinforcement, means securing said foot, floor, and reinforcing member to said outrigger in the region of said box-like reinforcement at a location intermediate the rail and column, and a structural connection between the outrigger and reinforcing member laterally outwardly from the last mentioned securing means.

14. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member having a portion thereof channel-shaped in cross section disposed in the vertical space between said floor and rail, said member extending laterally outwardly beyond said rail, a cantilever outrigger structurally united with said rail and projecting outwardly therefrom beneath said foot, floor, reinforcing member and column, first means securing said foot, floor, and reinforcing member to said rail, second means securing together said foot, floor, reinforcing member and outrigger laterally outwardly from said first means, and a structural connection between the outrigger, and third means securing said reinforcing member to said outrigger laterally outwardly from the second securing means and beneath said column.

15. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member having a portion thereof channel-shaped in cross section disposed in the vertical space between said floor and rail, said member extending laterally outwardly beyond said rail, a cantilever outrigger structurally united with said rail and projecting outwardly therefrom beneath said foot, floor, reinforcing member and column, first means securing said foot, floor, and reinforcing member to said rail, second means securing together said foot, floor, reinforcing member and outrigger laterally outwardly from said first means, and a structural connection between the outrigger, and third means securing said reinforcing member to said outrigger laterally outwardly from the second securing means and beneath said column, said reinforcing member and said floor having flanges disposed outwardly beyond the adjacent extremity of the outrigger abutting each other and welded together.

16. In a motor vehicle including a frame, a body including a floor and a column, an outrigger connected with said frame and with said body at the column thereof, a foot extending inwardly from said column overlying said floor and outrigger, a reinforcing member beneath the floor secured to the foot, floor, and frame, said reinforcing member having a portion thereof depressed relative to a registering portion of said floor forming therewith a boxed-in reinforcement extending laterally from said frame beneath said foot, floor, and column and above said outrigger, and a connector extending through the foot, floor, and reinforcing member at the said boxed-in reinforcement and secured to said outrigger.

17. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member extending laterally outwardly from the rail between the latter and said column beneath said floor and foot and secured thereto at locations spaced longitudinally of the foot, and an outrigger member extending into the space between said floor and rail and projecting laterally from the latter, said outrigger member being shaped in cross section to define a channel having vertically disposed flanges secured to said rail and a horizontal web connecting said flanges extending beneath said foot, floor, and reinforcing member and secured thereto, a portion of said outrigger member extending beneath said column and structurally connected therewith.

18. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a reinforcing member extending laterally outwardly from the rail between the latter and said column beneath said floor and foot and secured thereto at locations spaced longitudinally of the foot, and an outrigger member extending into the space between said floor and rail and projecting laterally from the latter, said outrigger member being shaped in cross section to define a channel having vertically disposed flanges secured to said rail and a horizontal web connecting said flanges extending beneath said foot, floor, and reinforcing member and secured thereto, a portion of said outrigger member extending beneath said column and structurally connected therewith, said column including a generally upright skirt below said floor and the vertically disposed flanges of said outrigger member terminating adjacent said skirt, said outrigger member including a component bridging the space between the vertically disposed flanges thereof extending outwardly beyond the last mentioned flanges and said skirt and secured to said column.

19. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a channel-shaped reinforcing member extending into the shaped section between the floor and rail and projecting laterally outwardly from the latter, said member having an intermediate wall and a pair of spaced side walls depending therefrom, said column including a skirt below said floor and each of said side walls having a terminal flange abutting and secured to said skirt, and an outrigger structurally connected to said rail and said column, said outrigger including a channel-shaped section extending between said skirt and side rail and into the space between said floor and rail, said channel section being received between the side walls of said reinforcing member and secured to said foot, floor, and intermediate wall of said reinforcing member.

20. In a motor vehicle including a frame having a side rail, a body structure including a floor overlying said rail in vertically spaced relation and projecting laterally outwardly therefrom, said body further including a hollow column having at least the base portion thereof disposed laterally outwardly from said rail and including a foot projecting inwardly from said column to overlie said floor and rail, a pair of members channel-shaped in cross section extending into the space between the floor and rail and laterally outwardly from the latter, each of said members including an intermediate wall beneath said foot and floor and secured thereto at spaced locations longitudinally of the foot and a pair of depending walls, each pair of walls increasing from a minimum depth at the region thereof between the floor and rail to a maximum depth between the rail and column, means securing one pair of said depending flanges to said column, at least one of said members being structurally connected with said rail and having a structural part thereof disposed beneath said column and secured thereto.

HAROLD A. HICKS.
IRA E. JOHNSON.
ALBERT W. ROSS.